US012778079B2

(12) United States Patent
Chen

(10) Patent No.: US 12,778,079 B2
(45) Date of Patent: Nov. 3, 2026

(54) PORTABLE PET WATER BOTTLE

(71) Applicant: Paikeni (Suzhou) Pet Products Technology Co., Ltd., Suzhou (CN)

(72) Inventor: Delun Chen, Suzhou (CN)

(73) Assignee: Paikeni (Suzhou) Pet Products Technology Co., Ltd., Suzhou (CN)

( * ) Notice: Subject to any disclaimer, the term of this patent is extended or adjusted under 35 U.S.C. 154(b) by 0 days.

(21) Appl. No.: 19/277,271

(22) Filed: Jul. 22, 2025

(65) Prior Publication Data

US 2026/0248101 A1 Aug. 27, 2026

(30) Foreign Application Priority Data

Feb. 26, 2025 (CN) ........................ 202520312219.9

(51) Int. Cl.
*A01K 7/00* (2006.01)
*B65D 47/20* (2006.01)

(52) U.S. Cl.
CPC ............ *A01K 7/00* (2013.01); *B65D 47/2075* (2013.01)

(58) Field of Classification Search
CPC .................................. B65D 49/04; A01K 7/00
See application file for complete search history.

(56) References Cited

U.S. PATENT DOCUMENTS

| | | | | |
|---|---|---|---|---|
| 12,168,207 | B2 * | 12/2024 | Noall | A23L 2/56 |
| 2011/0115103 | A1 * | 5/2011 | Tatera | B01F 23/23611 261/DIG. 7 |
| 2019/0216052 | A1 * | 7/2019 | Yang | A01K 7/00 |
| 2020/0339314 | A1 * | 10/2020 | Meyers | B65D 47/263 |
| 2023/0045609 | A1 * | 2/2023 | Xiao | A01K 7/00 |

* cited by examiner

*Primary Examiner* — Timothy D Collins
*Assistant Examiner* — Brittany A Lowery
(74) *Attorney, Agent, or Firm* — All West Law Group, PLLC; Aaron Powell

(57) ABSTRACT

A portable pet water bottle includes a bottle head, a connection cover, a rotary cover, a long gear, a bottle head seal ring, a water inlet pipe, an air exhaust pipe, a plurality of screw nuts and screws, a water outlet seal ring, an air inlet seal ring, a short gear, a water outlet, a plurality of positioning slots, a blockage slot, an air inlet, a cross seal ring, a lanyard, a backwater hole and a glass bead. The connection cover is provided with the rotary cover; the bottle head seal ring is arranged inside the rotary cover; the bottle head is fixedly connected to an outer wall of a top end of the bottle head seal ring. The top ends of the screws are threadedly connected to an inner wall of the bottom end of the bottle head.

4 Claims, 4 Drawing Sheets

PORTABLE PET WATER BOTTLE

CROSS-REFERENCE TO RELATED APPLICATIONS

The present application claims the benefit of Chinese Patent Application No. 2025203122199 filed on Feb. 26, 2025, the contents of which are hereby incorporated by reference.

TECHNICAL FIELD

The present invention relates to the technical field of pet water bottles and particularly relates to a portable pet water bottle.

TECHNICAL BACKGROUND

With the development of science and technology, people become increasingly extreme to product segmentation. People now prepare special water bottles for their pets, especially in the hot summer, when people go out with their pets. Traditional basins and bowls are not portable, and the habit of drinking water casually outside also brings a lot of viruses to pets. Therefore, there are many drinking problems when people go out with their pets. For the sake of convenience and hygiene, most people will carry a special pet drinking tool when they go out. However, common pet drinking tools are not portable because of large size. In view of these defects, it is necessary to design a portable pet water bottle.

Invention Content

The problem solved by the present invention is to provide a portable pet water bottle, which breaks through the original conventional button structure design and completely solves the button jamming and water leakage problems. The portable pet water bottle will not leak when it is not in use. Therefore, the pet water bottle of the present invention with excellent safety and simple structure is portable, cost-saving and more environmentally friendly.

In order to achieve the above objective, the present invention adopts the following technical solutions:

A portable pet water bottle includes a bottle head, a connection cover, a rotary cover, a long gear, a bottle head seal ring, a water inlet pipe, an air exhaust pipe, a plurality of screw nuts and screws, a water outlet seal ring, an air inlet seal ring, a short gear, a water outlet, a plurality of positioning slots, a blockage slot, an air inlet, a cross seal ring, a lanyard, a backwater hole and a glass bead. The rotary cover is arranged on the outer wall of the top end of the connection cover. The bottle head seal ring is arranged in the rotary cover. The bottle head is fixedly connected to the outer wall of the top end of the bottle head seal ring. The plurality of screw nuts is arranged on the inner wall of the top end of the connection cover. The plurality of screws is arranged on the plurality of screw nuts, and the top ends of the plurality of screws are threadedly connected to the inner wall of the bottom end of the bottle head. The water inlet pipe is arranged in the central position of the connection cover and communicated with the bottle head. The short gear is rotatably connected to the outer wall of the top end of the connection cover. The water outlet is arranged on the short gear at the position corresponding to the water inlet pipe. The water outlet seal ring is arranged on the inner wall of the water outlet. The glass bead is arranged in the water outlet seal ring. The backwater hole is arranged on the short gear. The air exhaust pipe passes through the connection cover. The blockage slot is arranged on the short gear. The air inlet seal ring is arranged in the blockage slot. The air inlet is also arranged on the short gear. The cross-seal ring is arranged in the air inlet. The long gear is fixedly connected to the inner wall of one side of the rotary cover, and one side of the long gear is meshingly arranged on the outer wall of the short gear. The lanyard is hung on the connection cover.

Further, a mounting groove is arranged at the top end of the connection cover. A spring is fixedly connected to the inner wall of the bottom end of the mounting groove. A movable bead is fixedly connected to the top end of the spring. The plurality of positioning slots is arranged at the bottom end of the short gear, and the movable bead can be clamped into the positioning slot.

Further, a water bottle is arranged at the bottom end of the connection cover. A straw is arranged on the outer wall of the bottom end of the water inlet pipe, and the straw is located inside the water bottle.

Further, three positioning slots are arranged in an arc line. The movable bead is clamped into different positioning slots to make the pet water bottle in a water outlet state, or a water stop state, or a water return state.

The beneficial effects of the present invention are breaking through the original conventional button structure design, completely solving the button jamming and water leakage problems. The portable pet water bottle will not leak when it is not in use. Therefore, the pet water bottle of the present invention with excellent safety and simple structure is portable, cost-saving and more environmentally friendly.

DESCRIPTION OF MARKS IN FIGURES

1—bottle head; 2—connection cover; 3—rotary cover; 4—long gear; 5—water bottle; 6—bottle head seal ring; 7—water inlet pipe; 8—air exhaust pipe; 9—mounting groove; 10—spring; 11—movable bead; 12—screw nut; 13—screw; 14—water outlet seal ring; 15—air inlet seal ring; 16—short gear; 17—water outlet; 18—positioning slot; 19—blockage slot; 20—air inlet; 21—cross seal ring; 22—straw; 23—lanyard; 24—backwater hole; 25—glass bead.

DETAILED DESCRIPTION OF THE EMBODIMENTS

The following will be combined with the drawings in the embodiments of the present invention to clearly and completely describe the technical solutions in the embodiments of the present invention. Obviously, the described embodiments are only part of the embodiments of the present invention, not all of the embodiments. Based on the embodiments of the present invention, all other embodiments obtained by ordinary technicians in this field without creative work are within the scope of protection of the present invention.

Specific embodiments are given below.

Figure 1:
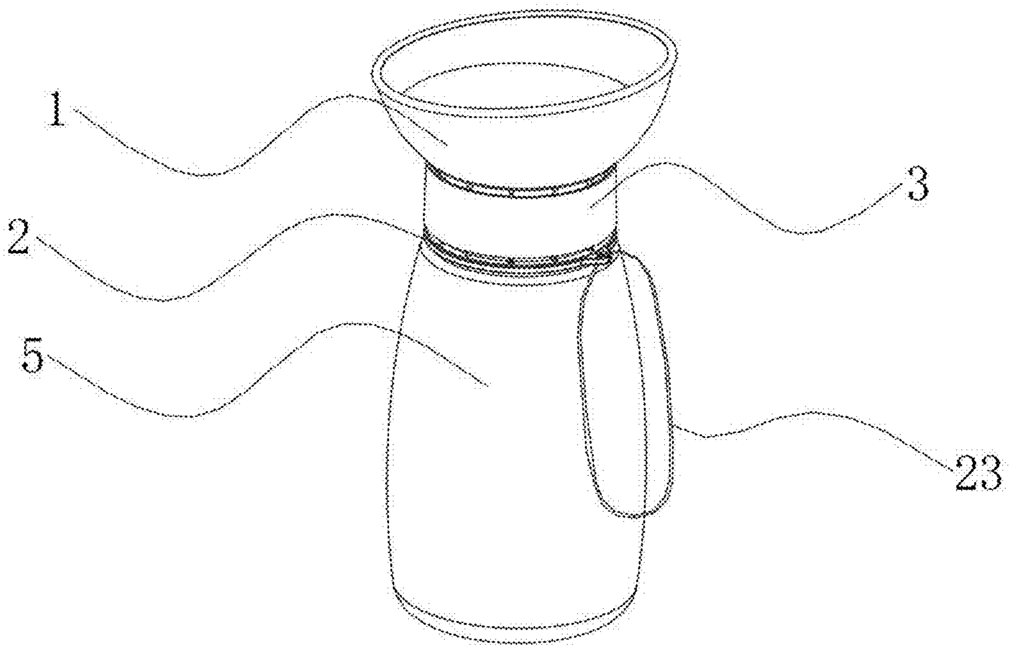
FIG. 1 is an overall three-dimensional diagram of the present invention.
Figure 2:
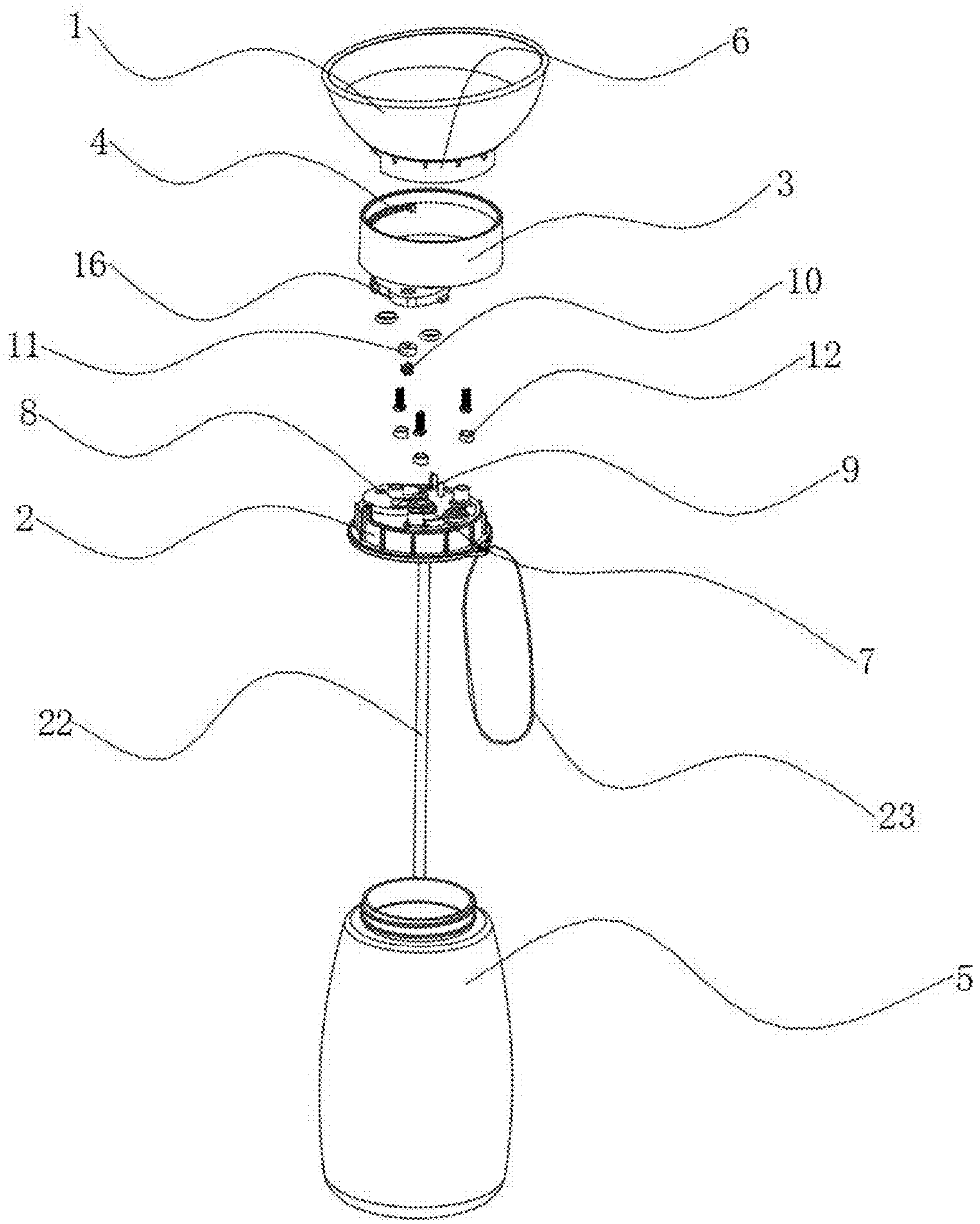
FIG. 2 is an exploded structural diagram of the present invention.
Figure 3:
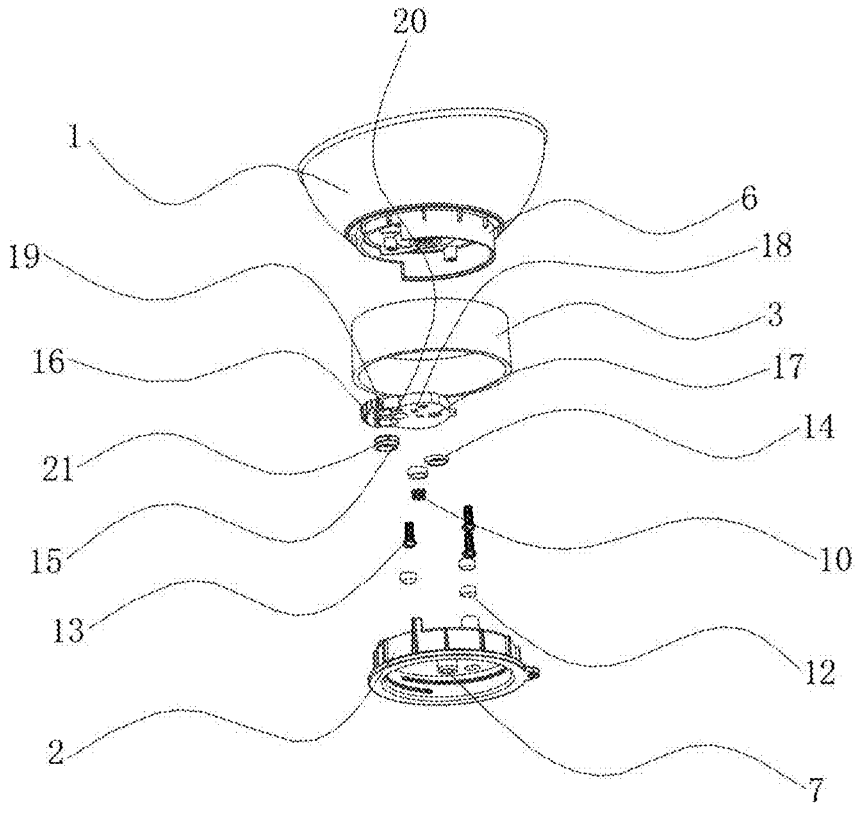
FIG. 3 is an exploded structural diagram of the present invention when viewed from below.
Figure 4:
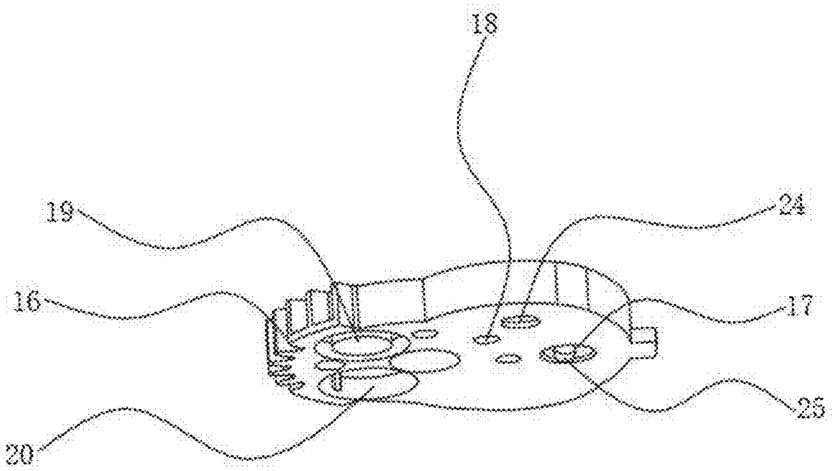
FIG. 4 is a three-dimensional structural diagram of the short gear of the present invention.

Referring to FIGS. 1 to 4, a portable pet water bottle includes a bottle head 1, a connection cover 2, a rotary cover 3, a long gear 4, a bottle head seal ring 6, a water inlet pipe 7, an air exhaust pipe 8, a plurality of screw nuts 12 and screws 13, a water outlet seal ring 14, an air inlet seal ring 15, a short gear 16, a water outlet 17, a plurality of positioning slots 18, a blockage slot 19, an air inlet 20, a cross seal ring 21, a lanyard 23, a backwater hole 24 and a glass bead 25. Rotary cover 3 is arranged on the outer wall of the top end of the connection cover 2. The bottle head seal ring 6 is arranged inside the rotary cover 3. The bottle head 1 is fixedly connected to the outer wall of the top end of the bottle head seal ring 6. The plurality of screw nuts 12 are arranged on the inner wall of the top end of the connection cover 2. The plurality of crews 13 are arranged on the plurality of screw nuts 12, and the top ends of the plurality of screws 13 are threadedly connected to the inner wall of the bottom end of the bottle head 1. The water inlet pipe 7 is arranged in the central position of the connection cover 2 and communicated with the bottle head 1. The short gear 16 is rotatably connected to the outer wall of the top end of the connection cover 2. The water outlet 17 is arranged on the short gear 16 at the position corresponding to the water inlet pipe 7. The water outlet seal ring 14 is arranged on the inner wall of water outlet 17. The glass bead 25 is arranged in the water outlet seal ring 14. Backwater hole 24 is arranged on the short gear 16.

The air exhaust pipe 8 passes through the connection cover 2. The blockage slot 19 is arranged on the short gear 16. The air inlet seal ring 15 is arranged in the blockage slot 19. The air inlet 20 is also arranged on short gear 16. The cross-seal ring 21 is arranged in the air inlet 20. The long gear 4 is fixedly connected to the inner wall of one side of the rotary cover 3, and one side of the long gear 4 is meshingly arranged on the outer wall of the short gear 16. When external force acts on the long gear 4 to make it rotate, the short gear 16 meshing with the long gear 4 will rotate synchronously, so that the blockage slot 19 rotates to a top end of the air exhaust pipe 8 or the air inlet 20 rotates to a top end of the air exhaust pipe 8.

The lanyard 23 is hung on the connection cover 2. A mounting groove 9 is arranged at the top end of the connection cover 2. Spring 10 is fixedly connected to the inner wall of the bottom end of the mounting groove 9. A movable bead 11 is fixedly connected to the top end of spring 10. The plurality of positioning slots 18 are arranged at the bottom end of the short gear 16. An external force can be applied to make the rotary cover 3 rotate, and then the long gear 4 on the rotary cover 3 drives the short gear 16 to rotate. During the rotation of the short gear 16, the first group of positioning slot 18 on the short gear 16 is rotated to the top end of the movable bead 11. And then under the elastic action of the spring 10, the movable bead 11 is pushed to move upward, so that it is clamped into the first group of positioning slot 18.

A water bottle 5 is arranged at the bottom end of the connection cover 2. A straw 22 is arranged on the outer wall of the bottom end of the water inlet pipe 7, and straw 22 is located inside the water bottle 5. By squeezing the water bottle 5, the water in the water bottle 5 will flow into the bottle head 1 through the straw 22, making it convenient for the pet to drink water.

The three positioning slots 18 are arranged in an arc line. The three positioning slots 18 can be used to position a water stop position, a water outlet position, and a water return position.

In actual applications, in order to facilitate users' use, a water outlet mark, a water stop mark, and a water return mark can be respectively arranged on the connection cover 2, and an indicator arrow can be arranged on the rotary cover 3. When the indicator arrow on the rotary cover 3 is aligned with the water stop mark, it represents that the movable bead 11 is clamped in the positioning slot 18 at the water stop position; when the indicator arrow on the rotary cover 3 is aligned with the water outlet mark, it represents that the movable bead 11 is clamped in the positioning slot 18 at the water outlet position; when the indicator arrow on the rotary cover 3 is aligned with the water return mark, it represents that the movable bead 11 is clamped in the positioning slot 18 at the water return position.

When in use, the user first unscrews the connection cover 2 from an outside of the water bottle 5, then fill the water bottle 5 with water, and then screw the connection cover 2 to the outside of the water bottle 5. When the user needs to feed pet water, the user applies force to align the indicator arrow on the rotary cover 3 with the water outlet mark on the connection cover 2, so that the long gear 4 on the rotary cover 3 drives the short gear 16 to rotate. During the rotation of the short gear 16, the first group of positioning slot 18 on the short gear 16 is rotated to the top end of the movable bead 11. And then the movable bead 11 is pushed to move upward under the elastic action of the spring 10 to be clamped into the first group of positioning slot 18. At this time, the water inlet pipe 7 on the connection cover 2 is in an open state.

Specifically, the water outlet 17 with the glass bead 25 on the short gear 16 coincides with the water inlet pipe 7 on the connection cover 2, and the air inlet 20 with the cross-seal ring 21 is staggered from the air exhaust pipe 8. At this time, when the water bottle 5 is squeezed, the glass bead 25 will separate from the water outlet 17 and push against the bottle head 1 under the action of pressure. At this time, the connection cover 2, the water inlet pipe 7 on the bottle head 1 and the water outlet 17 on the short gear 16 are in an open state. The staggered air exhaust pipe 8 and the air inlet 20 can play a sealing role, preventing the air outside the water bottle 5 from remaining in the water bottle 5. Due to the air pressure generated by squeezing, the water in the water bottle 5 can be freely squeezed into the bottle head 1. At this time, the pet can drink water in the bottle head 1 filled with water. The water in the bottle head 1 will not flow back into the water bottle 5 due to the air pressure of the water bottle 5.

When the pet is drinking water, the user applies force to align the indicator arrow on the rotary cover 3 with the water stop mark on the connection cover 2. The internal short gear 16 is also synchronously rotated to the blocking position under the action of the long gear 4, so that the blockage slot 19 is aligned with the air exhaust pipe 8. Under the action of air pressure, the water inlet pipe 7 on the connection cover 2 is in a closed state, and the water in the bottle head 1 will not flow back into the water bottle 5. In addition, an air inlet seal ring 15 and a water outlet seal ring 14 are respectively arranged at the blockage slot 19 and the water outlet 17 to avoid backflow.

When there is residual water in the bottle head 1, the user can apply a force to align the indicator arrow on the rotary cover 3 with the water return mark on the connection cover 2, and the internal short gear 16 also rotates synchronously under the action of the long gear 4, so that the water outlet 17 on the short gear 16 is connected with the water inlet pipe 7 on the connection cover 2, and the air inlet 20 is aligned with the air exhaust pipe 8. Under the action of air pressure, the cross-seal ring 21 is separated from the air inlet 20, so that the air inlet 20 on the short gear 16 is opened, and the water bottle 5 can be automatically exhausted. And the glass bead 25 will block the water outlet 17 under the action of gravity to play a sealing role, and then the water in the bottle head 1 flows into the water bottle 5 through the backwater hole 24 on the short gear 16.

The present invention breaks through the original conventional button structure design and completely solves the button jamming and water leakage problems. The portable pet water bottle will not leak when it is not in use. Therefore, the pet water bottle of the present invention with excellent safety and simple structure is portable, cost-saving and more environmentally friendly.

The above description is only a preferred specific implementation manner of the present invention, but the protection scope of the present invention is not limited thereto. Any technician familiar with the technical field can make equivalent replacements or changes according to the technical scheme and inventive concept of the present invention within the technical scope disclosed by the present invention, which should be covered by the protection scope of the present invention.

The invention claimed is:

1. A portable per water bottle comprising: a bottle head, a connection cover, a rotary cover, a long gear, a bottle head seal ring, a water inlet pipe, an air exhaust pipe, a plurality of screw nuts and screws, a water outlet seal ring, an air inlet seal ring, a short gear, a water outlet, a plurality of positioning slots, a blockage slot, an air inlet, a cross seal ring, a lanyard, a backwater hole and a glass bead; wherein the rotary cover is arranged on an outer wall of a top end of the connection cover; the bottle head seal ring is arranged in the rotary cover; the bottle head is fixedly connected to an outer wall of a top end of the bottle head seal ring; the plurality of screw nuts are arranged on an inner wall of the top end of the connection cover; the plurality of screws are arranged on the plurality of screw nuts; top ends of the plurality of screws are threadedly connected to an inner wall of a bottom end of the bottle head; the water inlet pipe is arranged in a central position of the connection cover and communicated with the bottle head; the short gear is rotatably connected to the outer wall of the top end of the connection cover; the water outlet is arranged on the short gear at the position corresponding to the water inlet pipe; the water outlet seal ring is arranged on an inner wall of the water outlet; the glass bead is arranged in the water outlet seal ring; the backwater hole is arranged on the short gear; the air exhaust pipe passes through the connection cover; the blockage slot is arranged on the short gear; the air inlet seal ring is arranged in the blockage slot; the air inlet is also arranged on the short gear; the cross seal ring is arranged in the air inlet; the long gear is fixedly connected to an inner wall of one side of the rotary cover; one side of the long gear is meshingly arranged on an outer wall of the short gear; and the lanyard is hanged on the connection cover.

2. The portable pet water bottle according to claim 1, wherein a mounting groove is arranged at the top end of the connection cover; a spring is fixedly connected to an inner wall of a bottom end of the mounting groove; a movable bead is fixedly connected to a top end of the spring; the plurality of positioning slots are arranged at a bottom end of the short gear; the movable bead can be clamped into the positioning slot.

3. The portable pet water bottle according to claim 1, wherein a water bottle is arranged at the bottom end of the connection cover; a straw is arranged on an outer wall of a bottom end of the water inlet pipe; and the straw is located inside the water bottle.

4. The portable pet water bottle according to claim 2, wherein three positioning slots are arranged in an arc line; the movable bead is clamped into different positioning slots to make the pet water bottle in a water outlet state, a water stop state, or a water return state.

* * * * *